UNITED STATES PATENT OFFICE.

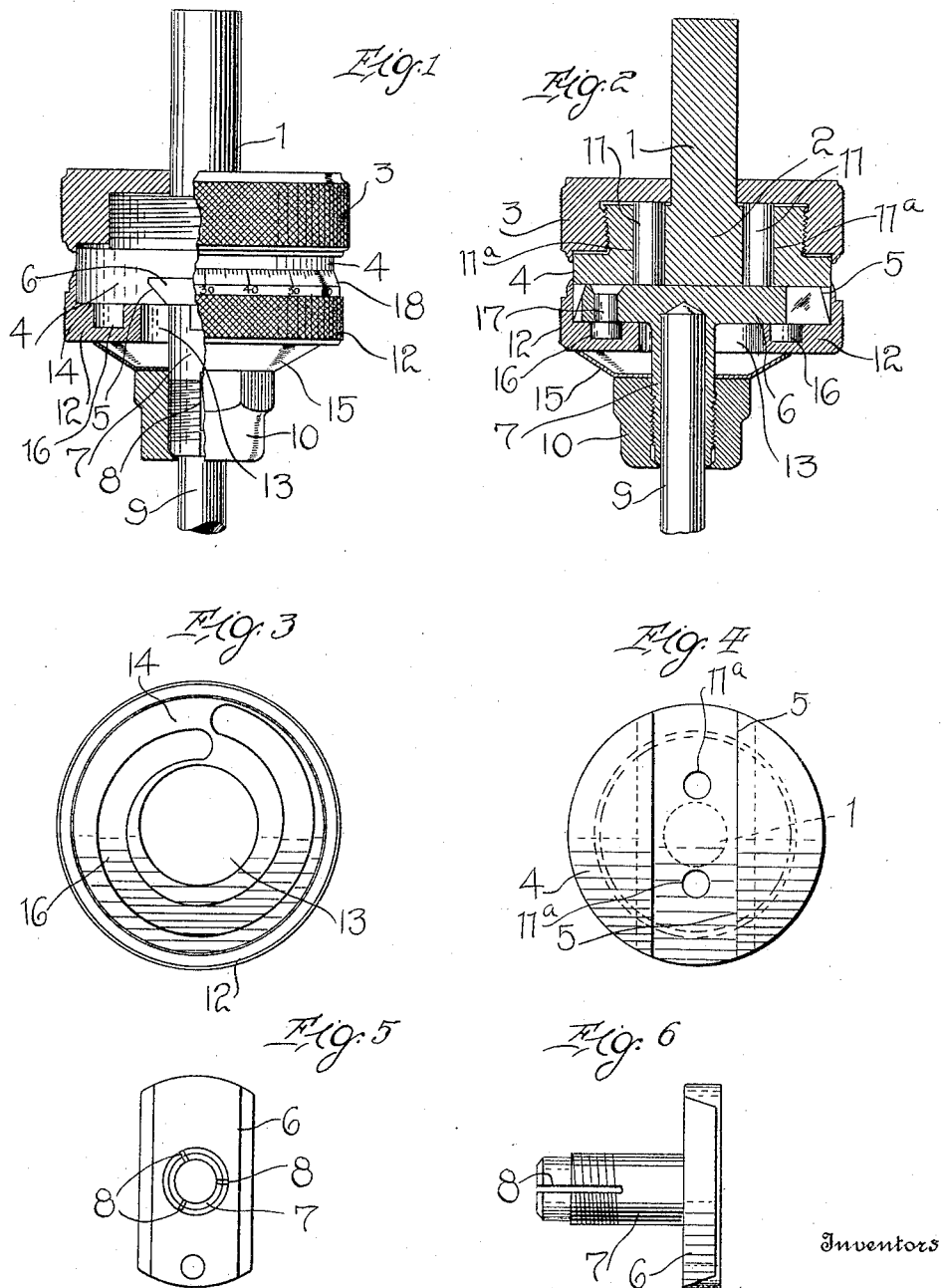

LAWRENCE CRANCE AND ALVIN E. FENSTERBUSCH, OF MOLINE, ILLINOIS.

ADJUSTABLE BORING-TOOL.

1,113,958.   Specification of Letters Patent.   Patented Oct. 20, 1914.

Application filed January 24, 1914. Serial No. 814,213.

*To all whom it may concern:*

Be it known that we, LAWRENCE CRANCE and ALVIN E. FENSTERBUSCH, citizens of the United States, residing at Moline, in the county of Rock Island and State of Illinois, have invented certain new and useful Improvements in Adjustable Boring-Tools, of which the following is a specification, reference being had to the accompanying drawings.

This invention relates to new and useful improvements in boring tools and more particularly to an adjustable boring tool and the primary object of the invention is to provide an improved tool holder which is capable of ready and accurate adjustment.

A further object of the invention resides in providing an improved holder composed of a plurality of parts, one portion of which has adjustable connection with another part thereof, through the medium of a cam slot and pin.

Still another object of the invention resides in providing a device which is simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claims.

In the accompanying drawings forming a part of this application, Figure 1 is a side elevation partly in section of a device constructed in accordance with our invention. Fig. 2 is a vertical section therethrough showing the drilling tool offset from the center of the device. Fig. 3 is a plan view of the member containing the eccentric slot therein. Fig. 4 is a bottom plan view of the intermediate member of the device. Fig. 5 is a bottom plan view of the movable member designed for carrying the boring tool; and Fig. 6 is a side elevation thereof.

In describing our invention, we shall refer to the drawings in which similar reference characters designate corresponding parts throughout the several views and in which—

1 indicates a spindle or shank formed on one face of a block or head 4 and loosely applied on said spindle or shank, is a nut 3, which is internally threaded. This internally threaded nut is engaged with a reduced upper threaded portion 2 of the block or head 4 and the outer peripheral edge of said nut 3 is knurled so as to be readily engaged by the fingers of the operator. That portion of the collar or block 4 below the threaded portion thereof and which depends from the nut 3 when the latter is applied thereto is provided with a diametrical dove-tail channel 5. Slidably mounted in this dove-tail channel 5, is a block or head 6, the side edges of which are beveled coincident to the inclination of the walls of said channel to fit snugly, but slidably therein. This block or head 6 forms the head of a sleeve-like gripping or clamping member 7 which is formed integral with the head and extends therefrom. This sleeve-like member 7 is split a plurality of times, as shown at 8 and is externally threaded. This member is adapted to receive the shank 9 of the boring tool and a sleeve-like nut 10 is provided for engagement with the threaded portion of the member 7 to tightly grip the two in position with respect to one another.

The block or collar 2 is provided with a pair of vertical channels 11$^a$ which are disposed on each side of the spindle or shank thereof and slightly spaced therefrom, said channels extending from the upper face of the member 4 to the channel 5 in said member. Disposed in these channels are the spacing pins 11 which are of slightly greater length than the length of said channels 11$^a$ and in this manner the locking nut 3 is prevented from binding tightly against the upper face of the member 4 and the lower ends of said pins may be caused to bind tightly against the upper face of the member 6, when desired.

An additional collar or the like 12 is provided, the same having an enlarged central opening, as indicated at 13. The upper face of this collar is offset to provide a seat, as shown at 14, whereby to receive the depending portion of the member 4 therein. When said member 12 is properly applied, the sleeve-like shank 7 depending from the block or head 6, extends through the enlarged central opening 13 of said member 12. A bowl-shaped spring washer 15 is so applied on the shank as to permit said outer peripheral edge to contact with the lower face of the member 12 when applied, so that when the nut 10 is properly applied to use, the same will be forced against this washer which, in turn, holds the member 12 in position against the member 4. This member 12 has the outer peripheral edge thereof also knurled, as has the member 3, and inasmuch as said member 12 is provided for the purpose of adjusting the boring tool with respect to the spindle, the same may be termed, for convenience, an adjusting nut. In carrying out the purpose of the device, for adjusting the tool, the upper face of the seat 14 on the member 12 is provided with an eccentric or cam slot 16, while the head member or block 6 is provided with a pin or stem 17 fitting within the slot 16. From this construction, it will be seen that as the member 12 is rotated, the pin 17 disposed in the cam or eccentric slot 16, will be caused to take a position in accordance with the direction of the slot and in view of the particular contour of said slot, will cause said member 6 to be moved in its channel 5, in one direction or the other, as the case may be. In the movement of the member 6, the sleeve-like shank 7 thereon with the shank of the tool 9 therein will also be moved and thus the tool may be adjusted to various positions with respect to the spindle 1.

In order to provide for proper adjustments, the outer periphery of the member 12, at the upper edge thereof, is beveled and provided with a scale or dial, as shown at 18, the same being graduated to thousandths of an inch, whereby very fine accurate adjustments may be made. It will be understood that after an adjustment has been made, the clamping nut 3 may be turned home on the member 4 and when so disposed, will securely lock the parts of the device in the particular positions to which the same have been adjusted. In order to permit any further adjustments to be made, the nut 3 must first be released and the adjustments may be made by the turning of the adjusting nut 12, as desired.

From the foregoing description of the construction of our improved device, the operation thereof and the manner of applying the same to use will be readily understood and it will be seen that we have provided an improved adjustable boring tool which is simple and durable in construction, inexpensive to manufacture and one which will be very efficient and useful in operation.

While we have particularly described the elements best adapted to perform the functions set forth, it is obvious that various changes in form, proportion and in the minor details of construction may be resorted to without departing from the spirit or sacrificing any of the principles of the invention as defined by the appended claims.

Having thus described this invention, what we claim is:—

1. In a device of the class described, a spindle, a head formed thereon and provided with a diametrical channel on its under face, a tool carrying member slidably mounted in said channel, an adjusting nut applied to the head and provided with an eccentric slot therein, and a pin carried by the tool carrying member and engaged within said slot whereby to adjust said tool carrying member to various positions with respect to the spindle, upon rotation of the adjusting nut.

2. In a device of the class described, a spindle, a head formed thereon and provided with a diametrical channel on its under face, a tool carrying member slidably mounted in said channel, an adjusting nut applied to the head and provided with an eccentric slot therein, a pin carried by the tool carrying member and engaged within the aforesaid slot whereby to slide the tool carrying member in the channel as said adjusting nut is rotated, and means for clamping the tool carrying member in any adjusted position with relation to the spindle.

3. In a device of the class described, a spindle, a head formed on said spindle and provided with a diametrical channel in its under face, a tool carrying member mounted in said channel, a sleeve extending laterally from the tool carrying member to engage the shank of a tool, an adjusting nut applied to the head and provided with an eccentric slot therein, a pin carried by the tool carrying member and engaged within the aforesaid slot whereby to slide said tool carrying member in the channel upon rotation of the adjusting nut, and a clamping member mounted upon the sleeve to clamp the tool carrying member in any adjusted position with relation to the spindle.

4. In a device of the class described, a spindle, a head formed thereon and provided with a diametrical channel on its under face, a tool carrying member slidably mounted in said channel, an adjusting nut applied to the head and provided with an eccentric slot therein, a pin carried by the tool carrying member and engaged with the aforesaid slot whereby to adjust said member to various positions with respect to the spindle upon the rotation of the nut, and clamping means having engagement with the head and said tool carrying member to clamp the latter in any adjusted position with respect to the spindle.

5. In a device of the class described, a spindle, a collar formed thereon, and provided with a dove tail diametrical channel in its under face, a tool carrying member provided with an elongated dove tail head slidably mounted in the dove-tail channel of the first mentioned head, an adjusting nut applied to the head and provided with an eccentric slot, a pin carried by the head of said tool carrying member and received in the aforesaid slot whereby to slide the tool carrying member and parts carried thereby in the channel as said adjusting nut is rotated, and means in connection with said head for clamping the tool carrying member in any adjusted position.

6. In a device of the class described, a spindle, a head formed thereon provided with a diametrical slot in its under face, said head being also provided with a pair of transverse channels disposed in planes on opposite sides of the spindle, said last mentioned channels terminating at their one ends in the one face of the head and at their opposite ends in the diametrical channel of the head, a tool carrying member having a head thereon slidably mounted in the diametrical channel in said first mentioned head, an adjusting nut carried on said head provided with an eccentric slot in the upper face thereof, and means in connection with said tool carrying member for supporting said adjusting nut in position in connection with the head and tool carrying member, a depending pin carried on the head of said tool carrying member and disposed within the slot of said adjusting nut, whereby to slide said tool carrying member laterally with respect to the spindle as said nut is rotated, a pair of pins disposed in the transverse channels of said head member, said pins being of slightly greater length than the channels in which the same are disposed and adapted to contact at their one end with the head on said tool carrying member, and a clamping nut in connection with the first mentioned head adapted for engagement with the one ends of said pins to clamp the latter in binding engagement with the tool carrying member for securing the latter in any adjusted position.

In testimony whereof we hereunto affix our signatures in the presence of two witnesses.

LAWRENCE CRANCE.
ALVIN E. FENSTERBUSCH.

Witnesses:
 WM. M. WALKER,
 LILLIAN DEISENROTH.

Copies of this patent may be obtained for five cents each, by addressing the "Commissioner of Patents, Washington, D. C."